No. 690,828. Patented Jan. 7, 1902.
C. D. BROWN.
COVER RETAINING DEVICE FOR POTS OR KETTLES.
(Application filed Feb. 11, 1901.)
(No Model.)
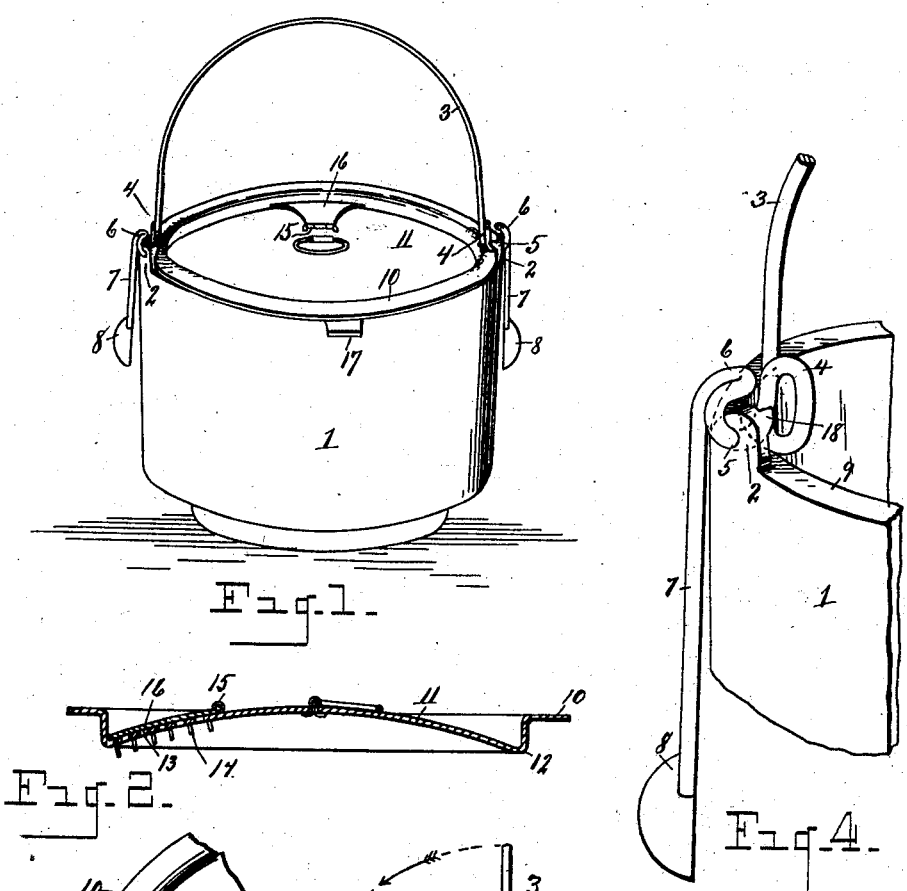
WITNESSES.
INVENTOR.
Charles D. Brown
By
Attorneys

UNITED STATES PATENT OFFICE.

CHARLES D. BROWN, OF VALLEY CENTER, MICHIGAN.

COVER-RETAINING DEVICE FOR POTS OR KETTLES.

SPECIFICATION forming part of Letters Patent No. 690,828, dated January 7, 1902.

Application filed February 11, 1901. Serial No. 46,770. (No model.)

*To all whom it may concern:*

Be it known that I, CHARLES D. BROWN, a citizen of the United States, residing at Valley Center, in the county of Sanilac, State of Michigan, have invented certain new and useful Improvements in Cover-Retaining Devices for Pots or Kettles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a cover-retaining device for pots and kettles; and it consists in the construction and arrangement of parts hereinafter fully set forth, and pointed out particularly in the claims.

The object of the invention is to provide simple and efficient means for retaining the cover in place upon the pot to prevent an accidental displacement thereof and permit the water to be drained from the pot without danger of scalding.

The above object is attained by the formation and arrangement of parts illustrated in the accompanying drawings, in which—

Figure 1 is a perspective view of a pot embodying my invention. Fig. 2 is a transverse section through the pot-cover. Fig. 3 is an inverted plan of a portion of the cover of the pot. Fig. 4 is an enlarged perspective view showing the formation on the bail of the pot for retaining the cover in place and the counterpoise for maintaining said bail in a vertical position. Fig. 5 is a side elevation of the upper portion of the pot and the bail.

Referring to the characters of reference, 1 designates the pot, which may be of any suitable construction, having upon opposite sides thereof at the top the opposed ears 2, adapted to carry the bail 3. Formed in the bail adjacent to said ears is a coil 4, from which leads a portion 5, which passes through and is journaled in the ears, forming the axis of oscillation of the bail. After passing through the ears the bail portion is bent upwardly, so as to embrace the ears, and is then provided with a return-bend, as shown at 6, from which the straight portion 7 of the bail extends downwardly and is provided on its lower end with a weight 8. The lower edge of the loop or coil 4 adjacent to the ears of the bail stands slightly above the rim 9 of the pot when the bail is in a vertical position, there being sufficient space only between said coil and the rim of the bail to admit of the entrance of the marginal flange 10 of the cover 11. As will be seen, the cover is provided with a depressed portion 12, forming a shoulder which engages the wall of the pot when the cover is in place thereon to maintain said cover in position.

To allow the cover to be slipped into place upon the pot, the bail is rocked down to the position shown by dotted lines in Fig. 5, when the coiled portion 5 of the bail, which is eccentric to the axis upon which the bail oscillates, will be carried away from the rim of the pot sufficiently to allow the cover to be readily slipped into place, after which upon releasing the bail the weights 8 will return it to a vertical position and cause said eccentric coils to engage the cover and maintain it securely in place.

Formed in the margin of the cover is a perforated triangular portion 13, crossed by the bars 14 on the under face thereof, which prevent said perforations from becoming clogged. Hinged at 15 to the upper face of the cover is a triangular lid 16, which is adapted to normally lie over said triangular portion and cover the perforations therein.

When the pot is tipped through the medium of the handle 17 to pour off the contents thereof, the force of the water or other fluid in passing through the perforations will lift the lid 16 and allow the contents to flow freely until the pot is drained. In the operation of pouring off the contents of the pot the bail 3 is grasped in one hand so that a slight strain is placed thereon to hold the eccentric coils 4 into contact with the cover and prevent the contents of the pot from forcing the cover out of place. Projecting laterally from the ears 2 (see Fig. 4) is a lug 18, adapted to be engaged by one side of the coil 4 to prevent the bail from swinging past a vertical position in one direction and the placing of too great a strain upon the cover through the eccentric coils 4. The cover may be readily removed by tipping the bail downward to the position shown by dotted lines in Fig. 5.

It will be seen that by means of the arrangement herein shown and described the cover is always maintained in position upon the pot and is not liable to dislodgment when the contents of the pot is being poured therefrom, obviating the liability of scalding and preventing the accidental discharge of vegetables or other articles being cooked through a slipping of the pot-cover.

Having thus fully set forth my invention, what I claim as new, and desire to secure by Letters Patent, is—

1. The combination with a pot, of a cover adapted to close the top thereof, a bail or handle hinged to the top and having a projection adapted to bear upon the cover when the bail is in a vertical position, the ends of said bail depending at the sides of the pot and having weights attached thereto, substantially as set forth.

2. The combination with a pot, of a cover adapted to close the top thereof, a bail hinged to the top and having a loop or coil therein eccentric to the axis of oscillation of said bail, said eccentric loop being adapted to bear upon the cover of the pot, when the bail is in a vertical position, to hold the cover against accidental displacement, the free end of said bail extending substantially parallel to the side of the pot and a weight attached thereto adapted to hold the bail in a vertical position.

In testimony whereof I sign this specification in the presence of two witnesses.

CHARLES D. BROWN.

Witnesses:
JAMES L. BENEDICT,
O. J. BROWN.